US012408647B1

United States Patent
Thornton, Jr. et al.

(10) Patent No.: US 12,408,647 B1
(45) Date of Patent: Sep. 9, 2025

(54) FISHING LINE CUTTING APPARATUS, SYSTEM, AND METHOD OF USING THE SAME

(71) Applicant: LIGHTIN UP LLC, Coral Gables, FL (US)

(72) Inventors: Peter Francis Thornton, Jr., Coral Gables, FL (US); Bart James Sontag Michelini, Key Largo, FL (US)

(73) Assignee: Lightin Up LLC, Coral Gables, FL (US)

( * ) Notice: Subject to any disclaimer, the term of this patent is extended or adjusted under 35 U.S.C. 154(b) by 23 days.

(21) Appl. No.: 19/008,016

(22) Filed: Jan. 2, 2025

Related U.S. Application Data

(60) Provisional application No. 63/665,732, filed on Jun. 28, 2024.

(51) Int. Cl.
| | |
|---|---|
| *B26B 11/00* | (2006.01) |
| *A01K 11/00* | (2006.01) |
| *A01K 61/95* | (2017.01) |
| *A01K 97/18* | (2006.01) |
| *B25G 3/20* | (2006.01) |
| *B25G 3/30* | (2006.01) |

(52) U.S. Cl.
CPC .............. *A01K 97/18* (2013.01); *A01K 11/00* (2013.01); *A01K 61/95* (2017.01); *B26B 11/00* (2013.01); *B25G 3/20* (2013.01); *B25G 3/30* (2013.01)

(58) Field of Classification Search
CPC ........ A01K 91/00; A01K 91/03; A01K 91/06; B26B 11/00
See application file for complete search history.

(56) References Cited

U.S. PATENT DOCUMENTS

| | | | |
|---|---|---|---|
| 1,851,370 A | 3/1932 | Munger | |
| 2018/0036868 A1* | 2/2018 | Maki | ........................ B25G 1/04 |

FOREIGN PATENT DOCUMENTS

| | | | | |
|---|---|---|---|---|
| FR | 2579070 A | 9/1986 | | |
| GB | 2360188 A | 3/2001 | | |
| GB | 2376862 A | 7/2002 | | |
| GB | 2423454 A * | 8/2006 | ............. | A01K 97/00 |
| WO | WO-2018144889 A1 * | 8/2018 | ............. | A01K 91/04 |

* cited by examiner

*Primary Examiner* — Jason L Vaughan
*Assistant Examiner* — Amanda Kreiling
(74) *Attorney, Agent, or Firm* — Daniel S. Bujas

(57) ABSTRACT

Apparatuses and systems suitable for separating aquatic animals, preferably large marine animals, from a fishing line, wire, and/or hook are disclosed herein. In an embodiment, the apparatus includes a base, which is affixable to an extender, having a return aperture and seat for receiving one or more blades to form a cutting edge along the return aperture; a cover rotatably fastened to the base; a locking point to affix the base and the cover; wherein the apparatus is configurable such that, if one or more straight-edge blades is inserted into the seat, no blade tip extends beyond a perimeter of the base and the cover. Also described are systems incorporating the apparatuses elsewhere described, further possessing an extender and one or more blades. Further, described herein are methods of using any of the apparatuses and/or systems elsewhere described to separate a marine animal from a line or hook.

30 Claims, 3 Drawing Sheets

FISHING LINE CUTTING APPARATUS, SYSTEM, AND METHOD OF USING THE SAME

TECHNICAL FIELD

The present invention relates to apparatuses and systems for separating aquatic animals, preferably large marine aquatic animals, from a fishing line and/or hook, along with methods for using the same.

CROSS REFERENCE TO RELATED APPLICATIONS

This application claims priority to U.S. provisional patent application No. 63/665,732, which was filed on 28 Jun. 2024, the entire contents of which is hereby incorporated by reference as if set forth fully herein.

BACKGROUND

Deep-sea fishing, otherwise known as large-game or big-game fishing, offshore sportfishing, offshore gamefishing, or blue-water fishing, is a form of recreational fishing targeting large game fish such as marlin, swordfish, sailfish, bluefin tuna, yellowfin tuna, bigeye tuna, and even a large variety of sharks. Although not necessarily limited thereto, such fishing activities usually occur on a large body of water such as a sea or ocean, and often miles from the shoreline. A preferred practice within recreational fishing—and especially deep-sea fishing—is the "catch and release" method. In such method, after capture, and occasionally after certain memorialization activities, the live fish is returned to the body of water from which it was caught. Such a method is desirable from a conservation and ecological standpoint and is especially important when fishing big-game animals that are threatened and/or take many years to grow to a size considered desirable for sportfishing.

A plethora of means to release fish by line- or hook-cutting exist. All else being equal, it is desirable to remove the hook directly from the animal. However, in the case of large and powerful marine animals, especially such as blue marlin, sailfish, and sharks, this is not readily possible, and it is therefore better for the health of the animal to simply cut the line. Whatever the method and apparatus employed, the angler should strive to impart the least amount of stress and minimize the risk of injury to the animal being caught. Although fishhooks rust and decompose in salt water relatively quickly, if care is not taken to cut the line at a point very near the hook, there exists a serious risk that the cut fishing line—which will not so readily decompose—entangles the animal directly or against another object in the sea. Accordingly, if fish-hook removal directly is not practical, it is important to cut the fishing line as close to the hook as possible.

Via currently known methods, cutting the line in this fashion poses concomitant risks to the angler, however. Existing hook cutting or line-cutting tools are short, hand-held devices. Proper use of such devices requires leaning over a fishing vessel and coming into proximity with a large, dangerous, and unpredictable animal often having a sharp bill and/or teeth. Risk of injury from contact with the animal, the vessel, objects on the vessel, or even being knocked overboard entirely, directly correlates with the angler's increased proximity to the animal during a release attempt. Thus, in such situations, the safety of the angler is often an unfortunate competing consideration with the welfare of the animal.

Furthermore, any line-cutting device used for this purpose must be able to reach and cut the desired length of line quickly and effectively without posing a substantial cutting hazard to the user. As can be envisioned, there exists a certain inherent tradeoff between effectiveness and safety, for instance in the case of a wholly open-blade design or one having a cutting aperture into which fingers may unintentionally be inserted (whether during operation or merely when being handled otherwise). Such designs, while being readily able to cut a fishing line when desired, would pose an increased hazard to the user.

In addition to safety-related considerations, the line cutting device itself further should be highly durable and enable long-term operation for its intended use. As deep-sea fishing line cutting devices are exposed to salt water, both the device itself—along with any fittings and the blades used—ideally should be corrosion-resistant and/or be readily replaceable at low cost. Existing tools for this purpose are currently equipped with captive—and often custom, difficult to source, and/or relatively expensive-blades. These blades quickly dull and/or rust, rendering the entire associated tool useless in a relatively short period of time, even when care is taken to clean and maintain it appropriately.

Even tools which theoretically allow for blade replacement are configured with many pieces of hardware for dis- and re-assembling the device. Especially when being operated on a vessel on even moderately wavy sea surfaces, it is difficult or otherwise undesirable to replace a large number of fittings, small screws, and/or devices pieces merely to replace a blade.

From the foregoing, it would be advantageous to provide an improved device suitable for line cutting in deep-sea fishing applications that allows for anglers to safely remove hooks and/or lines from an animal in a versatile fashion across multiple use-cases or with different animals in a manner that simultaneously minimizes risk to the animal. It would additionally and/or alternatively be helpful to provide an improved device which is durable, easy to use, non-corrosive, and is configured so as to allow for quick replacement of commonly used blades which may be available in most hardware stores, tool bags, in a variety of locations worldwide.

BRIEF SUMMARY

Inventors have herein discovered that one or more of the aforementioned problems can be solved when inventions according to various aspects and/or embodiments described herein are employed. Accordingly, described herein are several aspects and embodiments of the invention. A first aspect is a fishing line cutting apparatus including a base affixable to an extender, said base possessing a return aperture; a cover rotatably fastened to the base, said cover also possessing a cover return aperture; a single locking point to affix the base and the cover; a seat disposed between the base and the cover on either side thereof for receiving one or more blades to form a cutting edge on a proximate side and/or a distal side of the return aperture and/or the cover return aperture; wherein the apparatus is configurable such that, if one or more straight-edge blades is inserted into the seat, no blade tip extends beyond a perimeter of the base and the cover.

According to further embodiments of the first aspect the extender and base are aligned along a primary axis, wherein the cutting edge on the distal side is oriented at an angle of less than 45 degrees relative to the primary axis. In another embodiment of the first aspect, the cutting edge on the distal side is parallel or substantially parallel to the primary axis. In yet further embodiments, the cutting edges are oriented at various specified angles relative to each other. In still other embodiments, the base and/or cover further includes a main segment and return flange, wherein these sub-components are configured to form the return aperture, are oriented at various angles relative to each other and/or the primary axis, and optionally also include a rounded tip to cover a blade tip. In yet still further embodiments, various iterations and/or variations on the design of the cover, means for rotatably fastening the cover to the base, and optional intermediate tools are described.

A second aspect of the invention is a deep-sea fishing line cutting system, the system comprising (a) the apparatus as described in any of the embodiments of the first aspect of the invention; (b) an extender mated to the base which enables the apparatus to operate at a distance of at least 3 feet from an end of the extender; and (c) two straight-edge blades inserted into the seat; wherein an angle between the straight-edge blades is between 1-30°.

A third aspect of the invention is a method for separating a marine fish from a fishing line, the method comprising providing a deep-sea line cutting apparatus as described in any of the embodiments according to the first aspect and/or a system according to any of the embodiments of the second aspect, said apparatus further comprising an extender with a hand grip and two blades; positioning the apparatus such that the fishing line is placed within the return aperture; and contacting the fishing line with at least one cutting edge to cut the fishing line; wherein the fishing line is cut at a point of greater than 3 feet from the hand grip, preferably between 3 to 8 feet from the hand grip.

BRIEF DESCRIPTION OF THE DRAWINGS

FIG. 2 also notably depicts certain intermediate tools disposed on the fish line-cutting apparatus.

FIG. 3 further depicts one or more intermediate tools including a billfish tagging device.

DETAILED DESCRIPTION

Figure 1:
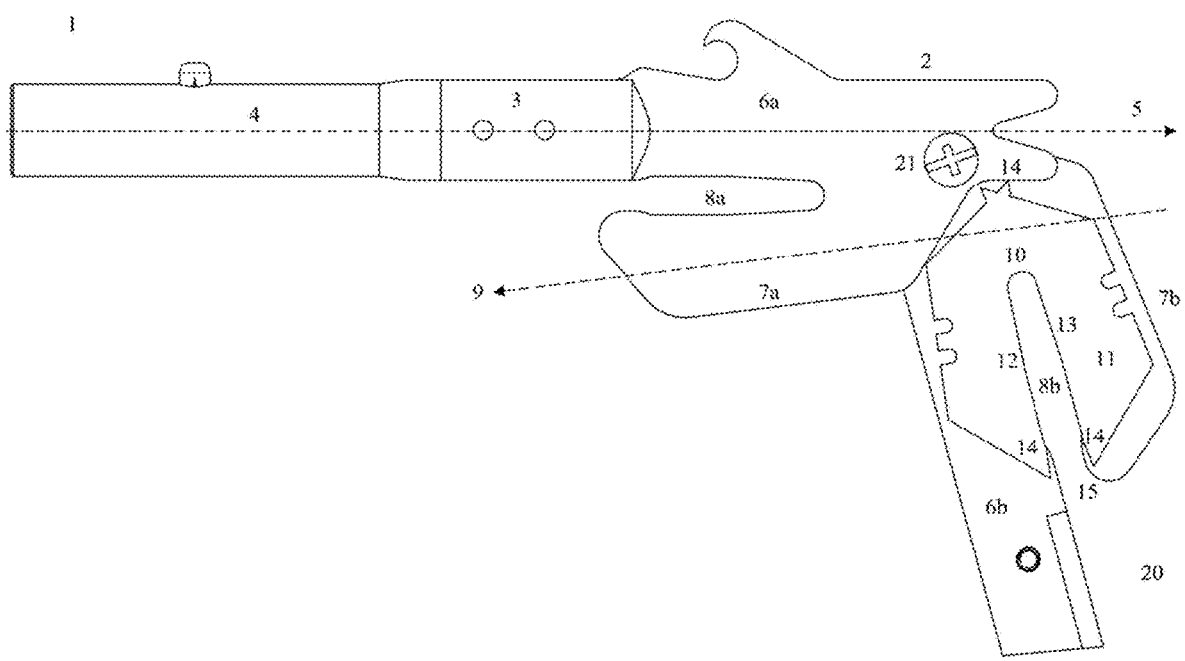
FIG. 1 shows a drawing of a fish line-cutting apparatus according to the first aspect of the instant invention, with the cover removed, and depicting further the interrelation between the apparatus and the extender and two blades insertable therein.

A first aspect of the current invention is a fishing line cutting apparatus (1) comprising: a base (2) affixable to an extender (4), said base possessing a return aperture (8a); a cover (20) rotatably fastened to the base, said cover also possessing a cover return aperture (8b);

a seat (10) disposed between the base and the cover on either side thereof for receiving one or more blades (11) to form a cutting edge on a proximate side (12) and/or a distal side (13) of the return aperture and/or the cover return aperture;

a single locking point (22) to affix the base and the cover; wherein the apparatus is configurable such that, if one or more straight-edge blades is inserted into the seat, no blade tip (14) extends beyond a perimeter of the base and the cover.

Embodiments of the fishing line cutting apparatus of the first aspect possess a base. This portion of the apparatus is a primary portion in the sense that the working cutting surfaces, compatible extenders, and enclosing covers are all typically (but not necessarily) affixed or able to be mated in some fashion thereto. The base may consist of a single piece or multiple pieces affixed or joined together according to customary means, such as gluing, welding, threading, or joining via hardware such as screws and bolts. It may possess any suitable shape, but preferably it is large enough to accommodate the blades that are to be inserted therein (or proximate thereto into the cover) during operation, the extender that will be mated thereto, and the cover that will be affixed thereon. Conversely, if the base is too large, then it will be difficult to store the tool, and it may possess additional unneeded mass such that operation becomes more difficult.

In a preferred embodiment, the base is largely elongated in shape, that is, while it should be wide enough to accompany the corresponding return aperture, it need not be substantially wider in order to minimize weight and usability. On the other hand, there exist advantages to a tool with a greater length, such as on the order of 6 inches, 12 inches, 18 inches, or more. Of course, in other embodiments, the base may be shorter, including but not limited to anywhere from approximately 3 inches to 12 inches, or 4 inches to 8 inches. Other lengths can be devised as deemed relevant for the particular application and material(s) of construction.

Furthermore, it is generally preferred that the base itself be as thin as possible. This is because a thicker base would increase the minimum distance between a hook and the location at which any line could be cut on the fish to be released; it is the preference of the inventors that, if a hook removal is infeasible or poses risk to the animal, the line should nonetheless be cut at a point as close to said hook as possible to minimize the amount of fishing line remaining along the mouth of the released animal.

The base may be constructed from any suitable material, such as various metals, plastics, composites, or even woods. It is preferred, however, that the base be fabricated of a largely corrosion-resistant material, given its intended application in seawater. According to an embodiment, the base is machined or cast out of a corrosion-resistant metal, such as stainless steel or aluminum. In another embodiment, the base is made of a durable plastic, such as nylon, and is fashioned via machining, injection molding, or other comparable known methods. In yet further embodiments, the base may be constructed via 3D printing methods, and the material may be a photopolymer via 3D printing methods such as stereolithography, or via thermoplastic powders or filaments, using processes such as selective laser sintering or fused filament fabrication.

Regardless of the overall shape and material of construction, the base according to various embodiments of the first aspect must be designed so as to be affixable to an extender. The base itself need not directly be mateable, it being understood that one or more intermediate components or sub-assemblies can be mated to the base and then further fashioned to the accompanying extender. Heretofore no known device suitable for cutting line and/or hooks for deep-sea fishing applications exist which facilitate operation at a distance such as those of the instant invention.

As used herein, the extender is any component which is not a direct part of the apparatus of the first aspect itself, but it may be used-ideally interchangeably with a host of other apparatuses—to mate thereto, thereby facilitating operation at a distance. Extenders are referred to herein not because of their necessary inclusion into embodiments of the first aspect of the fishing line cutting apparatus, but because they may define the structure and function of the apparatus given its intended relation thereto. In a preferred embodiment, the extender is a deck pole, which can be found on most fishing vessels for a variety of purposes. Such deck poles can be mated to a number of different apparatuses for different purposes, including deck brushing, mopping, polishing, retrieving items from the water via a net, etc.

In a preferred embodiment of the first aspect, the base of the fishing line cutting apparatus is affixable to such an extender to allow for the line cutting to occur at a distance beyond the reach of the angler holding such a tool directly. The distance of such extended operation of course depends upon the length of the extender used. Any suitable length of extender may be used.

A common extender found on deep sea fishing vessels are those manufactured by Shurhold®. Shurhold devices and systems utilize a principle called "quick release" or "quick connect" mating. This principle is based on a design that allows components to be easily connected and disconnected without the need for tools or excessive effort. In the context of Shurhold systems, this principle applies to their lineup of cleaning and maintenance tools for boats and vehicles. The components of these systems, such as brush heads, handles, and attachments, are designed to mate with each other swiftly and securely. This allows users to switch between different tools and accessories seamlessly, improving efficiency and convenience during cleaning and maintenance tasks.

Regardless of source, quick release mechanisms typically involve a combination of features such as grooves, tabs, and locking mechanisms that ensure a stable connection while still allowing for easy detachment when needed. This design principle not only enhances the user experience but also promotes versatility and adaptability in various applications.

Thus, in a preferred embodiment of the first aspect, the base is affixable to the extender via a series of such grooves, tabs, and/or locking mechanisms. The means of affixing such components is certainly not limited thereto, however. Other means of mating, such as a simple thread and/or bolt system, may be employed. In such embodiments, the base is configured to possess threading, which may be internal or external.

In addition to being affixable to an extender, the base of the first aspect of the current invention also possesses a return aperture. The return aperture is important as it forms a void or space into which the desired fishing line to be cut is inserted and then guided to the ultimate cutting surface(s). The return aperture should form a notch or void that initiates in a portion somewhere along the base and opens outward and terminates in a direction (relative to the initiation point) towards the hand of the angler using the tool. Thus, during operation, it is preferable that the apparatus is positioned such that it hooks around the fishing line and then cuts it via a motion back towards the angler. It is also preferable that the cover possesses a return aperture of substantially the same shape as the return aperture on the base and is alignable therewith; i.e. the two alignable return apertures allow for a longitudinal object like a fishing line to pass unimpeded between both such return apertures in a direction orthogonal or substantially orthogonal thereto when said return apertures are aligned together and locked in place consistent with the intended operation of the device.

In some embodiments of the first aspect, the base is configured out of at least two pieces or portions which form the return aperture therebetween. In an embodiment, such pieces or portions can be described as a main segment and a return flange. The main segment would be the portion of the base which is affixable (either directly or through one or more intermediate components and/or sub-assemblies) to the extender. The most distal point or section of the main segment (relative to the extender and, concomitantly the angler) would be mated, fastened, or otherwise joined or connected to the return flange, which would then face a direction back towards the direction of the extender/angler. In a preferred embodiment, the return aperture formed, whether by the unitary base, or via the main segment and return flange, is largely V-shaped, with the v opening outwards in a direction returning towards the angler during proper intended operation.

As will be appreciated, the return aperture defines the "working surface" of the line cutting tool, in that it forms a region within which the intended line cutting would occur upon the alignable return apertures being oriented and locked in a position consistent with intended operation. To further facilitate this operation, the base of certain embodiments of the first aspect will further possess a seat for receiving one or more blades. Alternatively or additionally, it is understood that in other embodiments of the first aspect, the seat will be located on the cover, rather than the base, will be appreciated by the skilled artisan to which this invention belongs.

Regardless of whether situated along the base and/or the cover, according to various embodiments of the first aspect, the seat is shaped in a way to receive one or more blades therein securely and to limit movement during intended operation. As such, the seat is preferably a region which is removed from the accompanying base (and/or cover) such that when the intended blade shape is inserted therein, such blade does not protrude from the top face of the base or cover into which it is inserted. Preferably, but not necessarily, the blades form a flush surface with the surrounding region of the base or cover when inserted. Accordingly, the seat is preferably a "negative" region fashioned via machining or other material removal. Of course, if molding or casting techniques are employed to fashion the base, the negative die or mold will be shaped such that the seat region will contain more material than the surrounding region of the base or cover.

In embodiments of the first aspect, the seat is disposed across a region situated on both sides of the return aperture and/or cover return aperture; i.e., along both intersecting lines of the "V" shaped aperture. This is done so that a cutting edge of a blade may be concomitantly formed along both sides of the return aperture and/or cover return aperture. As used herein, the return aperture and cover return aperture may be deemed to possess a "proximate" side, and a "distal" side. "Proximate" is intended to designate the side of the return aperture and cover return aperture that, when the mechanism is closed and locked into place during intended operation, is closer to the extender, portion of the base affixable to the extender, and/or the main segment. In other words, this is the side of the "V" of the return aperture which is closest to an imaginary axis-hereinafter referred to as the "primary axis"—which traverses along the extender and through the tool via the affixable base when the mechanism is closed and locked into place during intended operation. Distal, meanwhile, is intended to designate the side of the return aperture which terminates furthest from said extender, portion of the base affixable to the extender, and/or the main segment. In other words, the distal side of the return aperture is the side of the "V" of the return aperture which is furthest from the aforementioned primary axis.

In certain embodiments of the first aspect, the primary axis is positioned at certain orientations relative to other features of the apparatus. In some embodiments, the main segment is colinear (i.e., oriented along) the primary axis. In other embodiments, the main segment may be positioned in an orientation that is parallel to the primary axis; i.e., it may be offset therefrom. In still other embodiments, the main segment is generally elongated and a centerline therethrough is oriented at ±5°, or ±10°, or ±15°, relative to the primary axis.

In addition to the primary axis, a secondary axis is understood to be formed in certain embodiments as well. The secondary axis may be understood to be colinear with the distal side of the return aperture and/or the cover return aperture. Such secondary axis may be colinear, parallel to, or offset at a variety of angles (for example between 1-20°) from the corresponding cutting edge disposed on the distal side of the return aperture and/or the cover return aperture. If a portion of the base or the cover, including but not limited to the return flange, is substantially elongated with a constant width, the secondary axis can be considered to be parallel thereto as well.

Thus, in an embodiment, the return flange is oriented along the secondary axis, wherein the secondary axis is substantially in an anti-parallel direction relative to the main segment or the primary axis, or both. By anti-parallel, it is meant that the straight lines themselves are parallel to each other but are disposed in opposite directions. In other words, the primary axis can be deemed to originate at the end of the extender or at a point at which the base is mated to the extender, and then continues outward away from the direction of the angler while the tool is in operation. This direction of course would be opposite to the secondary axis, which would initiate at the base (or in some embodiments, more specifically the return flange), and terminate at a point which is closer to the angler while the tool is in operation. In other embodiments, the secondary axis is oriented at an angle of between 0-30°, or 0-20°, or 0-10°, or 0-5°, or 2-30°, or 2-20°, or 2-10°, relative to the primary axis. Although larger angles between the primary and secondary axis may be desired from the standpoint of maximizing tool opening for facilitating locating and inserting the fishing line or wire to be cut, if this aperture becomes too large, the device can present cutting edges which are easily accessible, thereby increasing the safety risk associated with the tool.

Regardless of the foregoing, in preferred embodiments of the first aspect, the apparatus is configured such that the seat is fashioned to receive one or more blades to form a cutting edge thereon along both the proximate side and the distal side of the alignable return apertures (i.e. the return aperture and/or the cover return aperture). It is nonetheless possible, however, for the seat to provide for only a single cutting edge, whether on the proximate side or the distal side of the return aperture and/or the cover return aperture.

Any suitable blade may be used, but it is highly desirable that the shape of the blade(s) used conforms to the shape of the seat into which it will be inserted. By conformal, it is meant herein that the shape of the seat and the accompanying blade is such that when the blade is inserted into the seat, it is immovable (or substantially immovable) during ordinary operation. It is highly preferable that the seat is configured to receive blade designs which are readily replaceable and/or are readily able to be sourced in a variety of, e.g., hardware stores or tackle shops throughout the world. Thus, although it is possible to envision a single unitary blade which itself forms cutting surfaces on both sides of the return aperture directly, it is preferably to use more than one blade, each independently forming a single desired cutting surface on each of the proximate and the distal side of the return aperture and/or the cover return aperture.

It is important to state that blades are not necessarily a required feature of the apparatus as described and claimed according to the first aspect of the invention. If the device is to be used, of course blade(s) will be included, but the improved apparatus of the first aspect is designed to be provided without the necessary inclusion of the blades. Further, the blades form a readily replaceable and/or consumable add-on to the apparatus. Their description is included herein not because of their necessary inclusion in the apparatus as provided, but because their shape and function define the way the apparatus is configured (specifically with respect to the seat design), given the ultimate relationship thereto during intended operation.

Regardless, in an embodiment, the device may be fashioned to accept common utility blades. Utility blades are essential tools in various applications, offering versatility and precision in cutting tasks. They come in various shapes and designs, including straight-edged and hook-shaped blades, each suited for different cutting needs. These blades are commonly made from high-quality materials such as carbon steel or stainless steel, ensuring durability and sharpness over prolonged use. They can possess—on the non-cutting edges—a variety of shapes, designs, and notches to assure optimal conformal fit to the intended mated surface or tool. In an embodiment, a 2-notch utility blade is used. In an embodiment, the seat is shaped so as to conformally receive such 2-notch blade. In an alternative embodiment, a 3-notch utility blade is used. In such an embodiment, the seat is alternatively shaped so as to conformally receive such a 3-notch blade design.

Although any brand of utility blade may be used as suitable, a particular example is the Stanley® brand of utility blades. Stanley is renowned for its innovation in utility blades, offering a wide range of options designed to meet the demands of professionals and DIY enthusiasts alike. Stanley utility blades often feature a design that enhances cutting performance and safety, with features like precision-ground edges and reinforced construction. These blades are engineered to provide long-lasting sharpness and reliability, making them a preferred choice for countless cutting applications in industries ranging from construction to crafting.

Regardless of the blade type with which the device and seat is configured to be used, it will be appreciated that such blade will typically possess both blade tips and cutting edges or surfaces. By blade tip, it is meant herein a point at which two or more edges or surfaces intersect. Either one or more than one of such edges or surfaces (or alternatively neither edge nor surface) may be cutting edges, that is, an edge that is designed to be the operational cutting portion of the blade.

In the interest of safety, it is typically desirable to minimize access only to blade tips, surfaces, or edges only as deemed necessary for operation—but not more. In the present context, it is desirable to limit or eliminate any exposed blade tips during operation, to prevent snags on the lines, minimize the opportunity for foreign objects to become snagged into the apparatus, and/or generally to further minimize opportunities for the fingers of an angler to be cut via unintentional insertion. Accordingly, in preferred embodiments of the first aspect, when conformal blades are properly inserted into the seat, no blade tip will extend beyond the perimeter of the base, including into the return aperture region. This means that, once the accompanying cover (described below) is affixed to the base and locked in position, such accompanying blade tips will be totally inaccessible during proper operation of the apparatus.

Furthermore, the return flange, cover, and/or base may otherwise be configured to comprise a lip. Such a lip would be disposed at the terminating portion of the distal side of the return aperture and/or the cover return aperture and may be provided to close the (otherwise) maximum gap of the return aperture and/or the cover return aperture. This feature can be included to improve the safety of the device by minimizing the change that an errant finger can become inserted into the return aperture and/or cover return aperture, which otherwise would be large enough for such unintended insertion to occur. This feature further can cover the blade tip of the associated blade inserted into the portion of the seat along the distal edge of the return aperture and/or the cover return aperture. Yet even further, this feature can be used to prevent an otherwise inserted fishing line from escaping the return aperture and/or the cover return aperture, at least before it is cut in the intended fashion. In a preferred embodiment, the lip will be rounded, and it will extend the perimeter of the base and/or cover, preferably further to cover at least a portion of the accompanying blade, such as the blade tip and/or at least a portion of the cutting edge.

Alternatively or additionally, a lip could also be disposed on the main segment, base, and/or cover along the proximate side of the return aperture and/or cover return aperture. The benefits of this feature would mirror those with respect to the lip disposed along the distal side of the return aperture and/or cover return aperture as discussed, supra.

The seat and/or blades, meanwhile, may be configured and/or selected in a plethora of ways so as to establish a desired length, shape, and/or orientation of each of the cutting edges. Such orientation may be configured in a manner so as to form a desired angle between both cutting edges, or additionally or alternatively, a desired angle between one or both cutting edges and an external reference line or component.

Given it is envisioned that both straight-edge blades and blades having other cutting surface geometries, may be used, it is helpful to clarify that for purposes of establishing orientation of a cutting edge herein, such edge is defined as a straight line along the cutting edge itself (as in the case of a straight-edge blade), or a straight along an imaginary line connecting the beginning and end of the cutting edge (which would not otherwise be straight in the case of a serrated blade). Given the multitude of potential blade designs available, the determination of appropriate orientation angle of a cutting edge for a particular blade will be appreciated by the skilled artisan to which this invention applies.

In a preferred embodiment of the first aspect, therefore, the apparatus is configured such that, when proper conformal blades are inserted into the seat, the resulting cutting edge formed on the distal side of the return aperture and/or cover return aperture is oriented at an angle of less than 45° relative to the primary axis. Such an acute angle is highly preferred to assure that the return aperture and/or cover return aperture is maintained as small as possible, as this minimizes the potential for an errant finger or hand to be inserted and cut therein. In other embodiments, this orientation is even lower still, such as less than 30°, or less than 25°, or less than 20°, or less than 15°, or less than 10°, or less than 5°. In yet other embodiments, the cutting edge formed along the distal side of the return aperture and/or cover return aperture is oriented at an angle of between 0-40°, or 0-30°, or 0-20°, or 0-10°, or 5-40°, or 5-30°, or 5-20°, or 5-10°, or 10-40°, or 10-30°, or 10-20°, relative to the main axis. To be clear, in still other embodiments, this angle can be 0°; i.e., the cutting surface along the distal side of the return aperture and/or cover return aperture can be parallel or substantially parallel to the main axis itself. Conceivably, in certain embodiments, this angle can reach negative values as well; i.e., the cutting surface on the distal side of the return aperture and/or cover return aperture can extend in a direction that points back towards the main axis. This is generally not preferred, however, as it would require a larger base and, absent a specialized blade or blades, such a design could lead to an unwanted gap in the cutting surfaces along or proximate to the vertex of the return aperture and/or cover return aperture. In a preferred embodiment, therefore, the cutting surfaces are positioned such that they intersect at a single vertex at the initiation point (or proximate to an initiation point) of the return aperture and/or cover return aperture.

In other embodiments of the first aspect, the apparatus is configured such that the cutting edge on the distal side of the return aperture and/or cover return aperture is oriented in certain desired fashions relative to the cutting edge on the proximate side of the return aperture and/or cover return aperture. As mentioned, it is preferable that the two aforementioned cutting edges intersect within the return aperture and/or cover return aperture at a single point; the relative angle therebetween may be adjusted as is desired depending on the application or configuration desired, depending upon, among other things, the length of the return aperture (and/or cover return aperture) and the desired maximum size of the aperture at its termination point. As the apparatus of the first aspect is primarily suitable for certain applications involving the capture and cutting of a very fine object—a fishing line or wire—the maximum aperture need not be very big. Of course, as it becomes larger, it becomes easier to engage the desired portion of fishing line, especially which may be moving in a fast and unpredictable fashion in view of its attachment to a powerful marine animal. This consideration must nonetheless be balanced against an aperture which exposes sharp surfaces to a human hand, particularly when handling the tool when it is not in use.

Therefore, in certain embodiments, the device is configured such that the cutting surface on the distal side of the aperture is oriented, relative to the cutting surface on the proximate side of the aperture, at an angle of between 10 to 20 degrees, or between 10-18 degrees, or between 11-17 degrees. In a preferred embodiment, the angle between the cutting surface on the proximate and distal sides of the aperture is approximately 14 degrees. The angle is configured to maximize ease of slicing the fishing line in the sense that it will facilitate greater engagement of the blade through the line. However, if the angle is configured to be too large, the width of the aperture will quickly become impermissibly wide, in the sense that fingers may become easily accessible therein. Conversely, if the angle is too small, an insufficient maximum aperture width would be formed unless the overall mechanism length is increased to levels which would undesirably increase weight and size.

Accordingly, depending upon the aforementioned angles, and the length of the return aperture and/or cover return aperture, the maximum width thereof can be adjusted. In some embodiments, therefore, the maximum width of the return aperture and/or cover return aperture is 50 mm or less, or 40 mm or less, or 30 mm or less, or 20 mm or less, or preferably 10 mm or less. Even more preferably, the maximum width of the return aperture and/or cover return aperture is maintained to 8 mm or less. Such a width would satisfy many so-called "finger probe" standards, such as, for example, UL 62841-4-2 and/or UL 1278.

Embodiments of the first aspect also include a cover. Whether the blades are inserted in a seat thereon or on the base, the cover is utilized to secure the inserted blades in a third dimension (the seat preventing movement in the two other dimensions) and also to enhance safety by limiting undesired access to the working, cutting surfaces of the fishing line cutting apparatus. While the aforementioned base is preferably configured so that no blade tip extends beyond its perimeter, this will only limit access to the blade in two directions and underneath said blades. Thus, while a variety of shapes may be employed in the cover design and it need not possess an identical profile to the base, the cover preferably is shaped in a fashion such that it also forms a perimeter on the top side of the blades into beyond which no blade tip should extend. In some embodiments, however, the profile of the cover matches or substantially matches the profile of the base. In any event, regardless of which side the seat and blades are provided, the cover is nonetheless disposed on a side of the base such that the blades, when inserted, are sandwiched and secured in between the base and the cover, thereby limiting any movement of the blades relative to the corresponding apparatus.

Although there is flexibility in the design of the cover according to various embodiments of the first aspect of the invention, it is important that the cover is shaped to as not to interfere with or block the entire desired return aperture. In fact, in three dimensions, a suitable aperture for locating, inserting, and cutting fishing lines and/or wires as desired remains and is disposed within both the base and the cover. Thus, regardless of the overall shape of the base and cover, it is preferred that the return aperture and the cover return aperture are shaped congruently or substantially congruently. Of course it is also preferred that the device possesses alignable return apertures that facilitate such a congruency when the return aperture and cover return aperture are placed in an alignment consistent with the intended operation of the device.

The cover is preferably rotatably fastened to the base. Inventors have prescribed such a design to maximize ease of use while replacing blades even on a moving boat. That is, the cover can be rotated away from its operating position to allow for access to the blades for a replacement, all while not needing to separate the cover from the remaining tool. This limits the possibility that the cover can become separated and lost—such by being dropped overboard unintentionally—from the base, which would preclude further operation of the tool.

In a preferred embodiment, the cover is rotatably fastened to the base at a single pivot point located towards the most distal portion of the apparatus (when referenced relative to the hand of the angler during operation). It is desirable to locate the pivot point beyond the seat and highly preferred that it is not situated along the seat, so as to ensure blade replacement can occur. In such case, a blade replacement could only occur if the blade itself possessed a specialized notched design. In an embodiment, the pivot point is located on a side of the base such that the seat is located between the pivot point and the extender.

The rotatable fastening mechanism comprises several components designed to facilitate rotational movement between the base and the cover. In one embodiment, the mechanism includes a first component configured to be attached to the base and a second component configured to be attached to the cover. The first component may comprise a circular base with an outer threaded perimeter and a central bore. The central bore accommodates a shaft extending from the second component. The shaft is equipped with complementary threads to engage with the threaded perimeter of the circular base. This threaded engagement allows for adjustable tension between the two components, enabling precise control over rotational resistance.

Furthermore, the second component may feature a protruding shaft with a complimentary bore to receive a locking pin. The locking pin serves to secure the rotational position of the base and the cover once they are aligned to the desired orientation. Additionally, the second component incorporates a lubrication reservoir and distribution channels to ensure smooth rotational movement over prolonged use.

To assemble the rotatable fastening mechanism, the first and second components are aligned and brought into contact. The threaded shaft of the second component is inserted into the central bore of the circular base on the first component. By rotating the second component, the threads engage with those on the circular base, drawing the two components together and creating a secure connection. Once connected, the rotational movement between the cover and base is facilitated by the smooth interaction of the threaded shaft and circular base. The locking pin can be inserted through the bore in the protruding shaft of the second component to fix the rotational position when necessary.

The cover itself may be constructed via any suitable means and material, although it is preferred that it is generally non-corrosive to assure it will hold up to prolonged use despite exposure to seawater. The cover may be single layer or utilize a multi-layered construction, incorporating a variety of materials chosen for their resistance to corrosion and environmental wear. In one non-limiting embodiment, the cover comprises multiple layers, including an outer layer, a core layer, and an inner layer, each serving specific functions to enhance the protection and longevity of the fishing tool.

In non-limiting embodiments where a multilayer cover is used, the cover, or merely the outer layer, may be crafted from a high-density polymer material known for its exceptional resistance to corrosion and abrasion. This layer acts as the primary barrier against external elements such as saltwater, sunlight, and abrasive surfaces encountered during fishing activities. Additionally, the outer layer may feature a textured surface or pattern to improve grip and handling, especially in wet conditions.

The cover, or further a core layer, may be chosen to provide structural support and impact resistance to the cover, thereby safeguarding the enclosed fishing tool from potential damage caused by impacts or collisions. In one embodiment, the cover or core layer thereof consists of a composite material reinforced with carbon fibers or aramid fibers, offering a balance of strength and flexibility.

In an embodiment whereby a multilayer cover is used, to construct the non-corrosive cover, the layers are assembled using techniques such as injection molding, compression molding, or thermoforming, depending on the selected materials and desired design specifications. The outer layer is molded to the desired shape and texture, with provisions for attachment points, handles, or access ports as needed. The core layer is then bonded to the outer layer, followed by the installation of the inner layer to complete the assembly process.

In addition to the multi-layered construction, the non-corrosive cover may incorporate features such as UV stabilizers, anti-fungal agents, and chemical-resistant coatings to further enhance its performance and longevity in harsh marine environments.

Inventors have surprisingly discovered that the fishing line cutting apparatus of the first aspect of the invention may be constructed in a stable fashion despite locking the base and cover at only a single point. That is, inventors have envisioned a design whereby the cover can be fixed in place relative to the base once it has been rotated in the desired position and then locked in at only a single point. This design feature is advantageous because it increases the ease-of-use in the sense that blade replacement can occur via cover removal (or rotation away as the case may be) in the fewest number of operations possible.

The locking mechanism is designed to employ a simple yet effective design to ensure a secure and reliable connection of the base and cover at the single locking point. In a preferred embodiment, at the heart of the mechanism is a locking pin that extends through corresponding apertures in both the base and the cover when engaged. The locking pin preferably features a tapered end that facilitates easy insertion into the apertures, followed by a twisting motion to secure it in place. The base may be equipped with a recessed cavity designed to accommodate the locking pin when the cover is positioned over it. Conversely, the cover preferably features a matching aperture aligned with the cavity in the base to allow the locking pin to pass through. Once the cover is positioned correctly over the base, the user applies slight pressure to align the apertures, allowing the locking pin to be inserted. With the locking pin in place, a secure connection is established between the base and the cover, preventing unintended separation during use. To release the locking mechanism, the user simply applies counter-twisting force to the locking pin, allowing it to be withdrawn from the apertures and disengaging the base and cover. This simple yet robust locking mechanism provides a convenient solution for joining two pieces securely at a single locking point.

Of course, other means for locking the base and cover at the single locking pin may be employed. In a non-limiting such embodiment, a single screw may be inserted into a threaded cavity extending in a cylindrical fashion through both the cover and base. Any other means of suitably locking the base to the cover can be used.

Additionally, the fishing line cutting apparatus of the first aspect may include one or more intermediate tools. Intermediate tools for purposes herein are defined as one or more additional working surfaces, components, or sub-assemblies that are designed to perform a function other than the cutting of a fishing line or wire, but are nonetheless added to the base, cover, or an additional plate, piece, or sub-assembly that forms part of the ultimate fishing line cutting apparatus.

Any number or type of intermediate tools can be employed as is suitable and desired. According to one embodiment, the intermediate tools comprise a bottle opener. In another embodiment, the intermediate tools comprise a pike. In yet a further embodiment, the intermediate tools comprise a billfish tagging device.

The fishing pike is a specialized intermediate tool designed to assist anglers in safely and efficiently disengaging fishhooks, particularly when the fish is caught at a distance from the angler. The fishing pike is ideally made of lightweight and durable material and is designed to provide the necessary reach to access fish and remove hook under significant forces. The pike preferably features a slim and elongated profile to navigate the tight spaces of a fish's mouth. It preferably features a precision-engineered tip with a narrow opening and a curved or serrated edge, allowing it to securely grasp the fishing hook embedded in the fish's mouth. Additionally, the pike may incorporate a locking mechanism or spring-loaded action to firmly grip the hook during retrieval, minimizing the risk of accidental slippage. To use the fishing pike, the angler extends the handle towards the hooked fish, positioning the pike directly over the embedded hook. With gentle yet firm pressure, the angler maneuvers the pike to engage with the hook, ensuring a secure grip. Once the hook is securely held by the pike, the angler carefully twists and maneuvers the tool to dislodge the hook from the fish's mouth, ideally minimizing trauma and injury to the fish.

A billfish tagging device is designed for use in the tracking and monitoring of billfish species, such as marlin, sailfish, and swordfish. The primary function of the billfish tagging device is to collect and transmit biological, environmental, and behavioral data from billfish during their movements across marine environments. The device, which can be optionally incorporated and fitted as one of several intermediate tools to the devices according to various aspects of the current invention, may comprise a lightweight, durable housing constructed from corrosion-resistant materials, such as titanium or high-strength polymers, ensuring longevity and reliability in saltwater environments. The housing is optionally designed to securely contain electronic components, such as a GPS tracking unit, an accelerometer, and a data logger, which are housed within a water-tight, pressure-resistant chamber to prevent damage during extended underwater deployment.

The device is preferably equipped with a hydrodynamic tag attachment mechanism. The attachment mechanism features a barbed or dart-shaped anchor, which allows for secure and safe affixation to the fish's dorsal fin or body. This method ensures that the device remains attached during normal fish activity while minimizing harm to the fish. The device is typically fastened to the billfish using a mechanical or adhesive means, such as a biodegradable tether that disintegrates after a predetermined time or upon exposure to marine conditions, allowing the device to detach safely once its purpose is fulfilled.

The tagging device is designed for use in both recreational and commercial fisheries, as well as for research and scientific purposes, thereby allowing for the non-invasive tracking of billfish in a variety of habitats, from nearshore waters to deep-sea regions. The billfish tagging device serves as a crucial tool for marine biologists, fisheries researchers, and conservationists in understanding the ecological role of billfish in marine ecosystems. By tracking the movements and behaviors of billfish, researchers can gain valuable insights into migratory routes, breeding grounds, and interactions with other marine species. This data is essential for developing sustainable fisheries management practices, conservation strategies, and protecting billfish populations from overfishing.

Its ability to withstand harsh marine conditions and provide continuous, real-time data makes it an essential tool for advancing marine research and fostering the sustainable management of global billfish populations.

In a preferred embodiment, the intermediate tool comprises a billfish tagging device, thereby enabling the user of the device according to the instant invention to both release a fishing line and apply a billfish tagging device from a single tool and optionally also in a single operation. This safely and efficiently enables multi-purpose interactions with the marine animal, obviating the need to switch tools or have an additional person on hand to safely provide or utilize the second tool to complete the safe release of the animal.

If used, the one or more intermediate tools are constructed from non-corrosive materials such as stainless steel or reinforced plastic to withstand exposure to water and salt.

The one or more intermediate tools may be incorporated into the construction of the fishing line cutting apparatus in any suitable fashion, such as via attachment to the base, to the cover, or by means of one or more intermediate plates or surfaces which may be incorporated in between the cover and the base, or on the outside of the cover or the base. Preferably, the one or more intermediate tools is fabricated directly as part of the base and/or cover. Minimizing the number of plates or layers may be desirable to minimize the overall width of the tool, which facilitates a more precise cut and enables line separation as close to the fish as possible.

Certain non-limiting example embodiments of the fishing line cutting apparatus of the first aspect are depicted in the accompanying figures. The following such examples and descriptions of figures further illustrate the invention but, of course, should not be construed as in any way limiting its scope. Turning to FIG. 1, a fishing line cutting apparatus 1 is depicted. Such apparatus includes a base 2 which is affixed to an extender 4 by means of an end piece 3 which slides into the extender and is affixed by means of a nut and bolt. The extender 4 is a metal pole which is fashioned here of aluminum; not shown is the portion of the pole that is held by the angler while the tool is in operation. The end piece 3 itself, meanwhile, is adjoined to the base at two points by means of locking bolts. An imaginary ray, initiating through the center of and along the cylinder of the pole that makes up the extender 4, is depicted as primary axis 5. Primary axis 5 continues as a straight line extending in a direction through the base and away from the angler while the tool is in operation.

The largely flat, plate-shaped base 2 further includes a main segment 6a and a return flange 7a; such items are merely different regions of the base, each having a substantially elongated and constant-width shape.

The return flange 7a is oriented along a secondary axis 9 that extends inwards initiating from the primary axis and towards the general direction of the extender and back towards the angler during the tool's proper operation. The base 2, via the further orientation of the main segment 6a and return flange 7a extends in a perimeter thereby forming a (base) return aperture 8a. Base return aperture 8a is a u-shaped absence of material in the base, which initiates at an intersection between the main segment 6a and the return flange 7a and opens towards the extender and the angler during operation.

Rotatably fixed to the base 2 at pivot point 21 is the cover 20. Although it can equally be disposed on the base 2, as shown in FIG. 1, a seat 10 is disposed thereon. The seat 10 is a region of recessed material depicted in FIG. 1 to be formed into the cover along both a cover main segment 6b and a cover return flange 7b for receiving two blades 11. The seat is conformal to two, 2-notch straight edge utility blades 11 having a number of blade tips 14 which intersect in the base and form cutting edges on both a proximate side 12 and a distal side 13 of a cover return aperture 8b. Notably, the blade tips 14 are fully contained within a perimeter of the cover 20, and a portion of the cutting edges along both the proximate 12 and distal 13 sides are as well. A rounded lip 15 is disposed within the cover return aperture 8b along the cover return flange 7b and bounds within its perimeter a portion of the blade 11 disposed within the seat 10 along the distal side 13. Notably, the cover return aperture 8b is alignable with the return aperture 8a (alignment shown in FIG. 2).

As depicted in FIG. 1, the primary axis 5 is oriented at an angle of approximately 10 degrees relative to the secondary axis 9. Furthermore, the cutting edge (which would be formed upon insertion of conformal straight-edge blades into the seat 10) on the proximate side 12 is oriented relative to the cutting edge on the distal side 13 at an angle of approximately 14 degrees. The return aperture 8a and cover return aperture 8b (which share a congruent perimeter when the cover 20 is rotated to be and locked in line with the base) have a width at the rounded lip 15 of about 8 mm.

Figure 2:
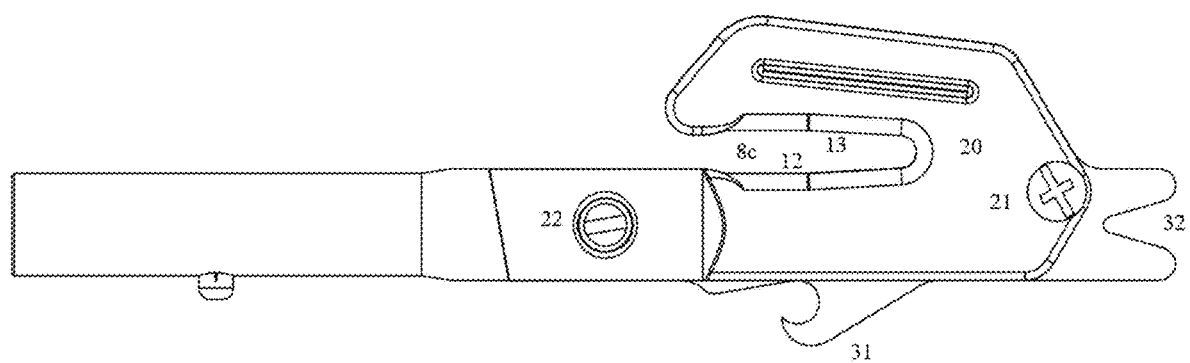
FIG. 2 shows a photograph of the same line-cutting apparatus according to the first aspect of the instant invention as shown in FIG. 1, however in FIG. 2 the cover of the apparatus is inserted thereon and locked into place.

FIG. 2, meanwhile, depicts the line cutting apparatus of FIG. 1, merely now with the cover 20 rotated and locked into place in conformance with the base 2, as would be performed prior to utilizing the device. Turning to FIG. 2, the cover 20 lies atop base 2 and is rotatably fastened thereto at pivot point 21. In the embodiment depicted in the figure, a screw protrudes through the pivot point. The cover 20 is of a shape which is of substantially the same perimeter and outline as the corresponding portion of the base 2. The cover 20 sandwiches the blades 11 (not shown) leaving a part of the (hypothetical) cutting surface along the proximate side 12 and the distal side 13 but no blade tips 14 accessible. Also, an alignment of the return apertures is demonstrated, thereby forming an aligned return aperture 8c.

Further, the cover 20 is mated to the base 2 via single locking point 22; when the fastener at single locking point 22 is inserted to the cover 20, the device is locked and ready for operation. Notably, a recessed channel is positioned on the cover 20 near single locking point 22; the configuration shown allows for removal of cover 20 without fully removing the screw inserted into single locking point 22. Such a design assures that the cover can be rotated away from base 2 for the replacement of blades 11 in a clockwise fashion about pivot point 21 without a full disassembly or removal of any single component or fastener.

Figure 3:
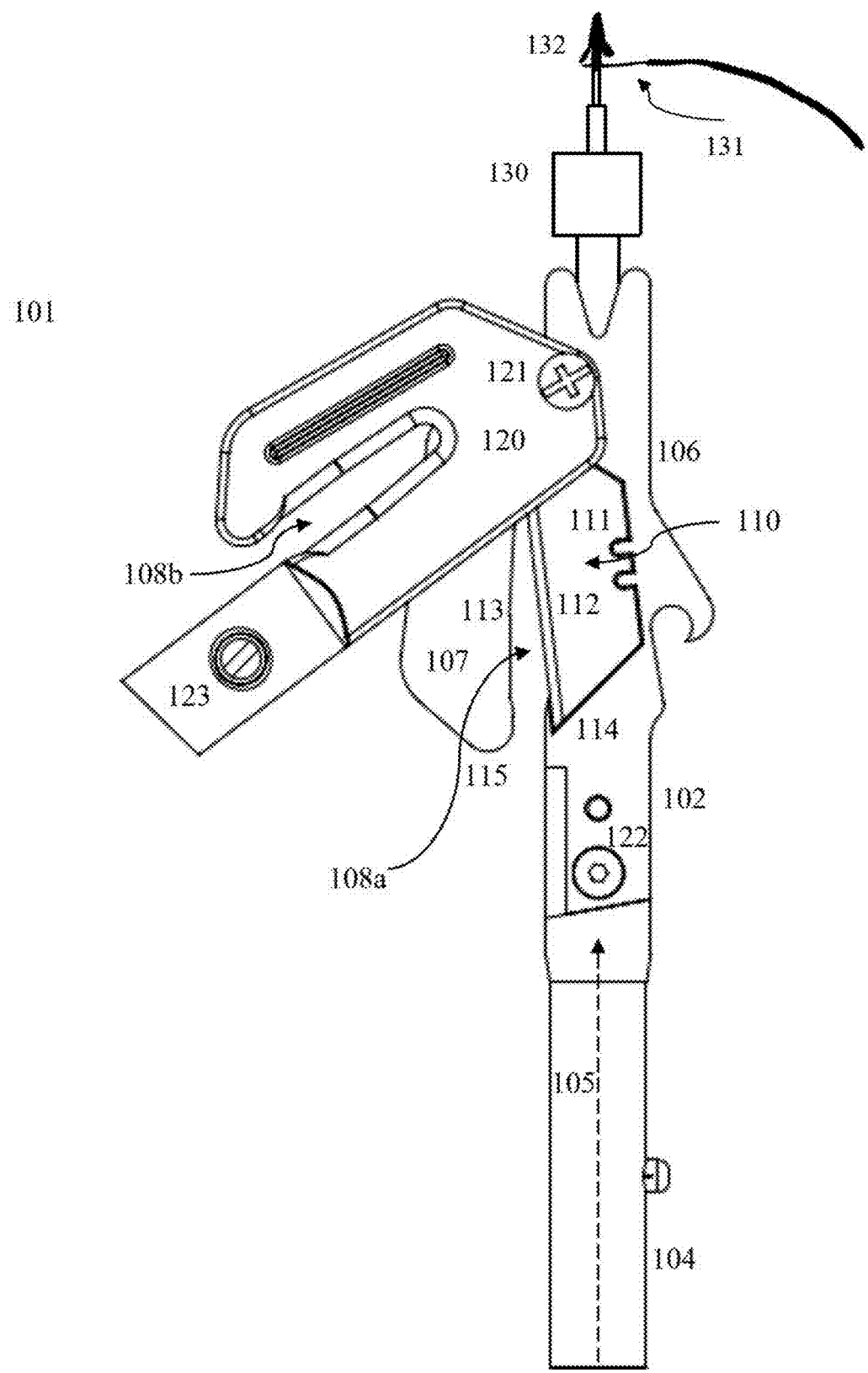
FIG. 3, meanwhile, shows a drawing of a different embodiment of a fish line-cutting apparatus also according to the first aspect of the invention, with both cover and base depicted. Herein, the seat is located on the base as opposed to the cover it being further demonstrated further that the cover is disengaged and rotated away from the single point at which it locks to the base in a clockwise fashion.

The line cutting apparatuses depicted in FIGS. 1-3 further include certain intermediate tools. Specifically, when viewing FIG. 2, an opener 31 is located on a separate plate affixed to the base on a side oppose the seat 10 and the cover 20. Also included on the same plate is a pike 32 for removing fishhooks. FIG. 3, meanwhile, illustrates a billfish tagging device 130 mounted at the distal end of the fish line cutting apparatus 101. Said billfish tagging device is further equipped with a hydrodynamic tag attachment mechanism 131. The attachment mechanism features anchor 132.

FIG. 3 further depicts a different embodiment of the fish line cutting apparatus of the first aspect 101 in which the blades are insertable onto the base rather than the cover. It possesses base 102, which notably is elongated and has a main segment 106, a centerline through which is oriented substantially parallel to the primary axis 105. An extender 104 is affixable to an end of the base 102 at an end 103.

Furthermore, the base 102 possesses a return flange 107 itself further having a rounded lip 115. The channel formed between the perimeter of the main segment 106 and the return flange 107 (including rounded lip 115) is the return aperture 108a (a corresponding cover return aperture 108b is substantially conformal therewith when the cover is rotatably fastened and locked for use). Protruding into the return aperture 108a is a cutting surface on a proximate side 112 of the return aperture, which is formed via the placement of a 2-notched straight utility blade 111 having blade tip 114 that is inserted into seat 110. In the embodiment depicted in FIG. 3, only a single blade is inserted into a seat 110 which is only present embedded in the main segment 106 of the base 102. Thus, in this embodiment, there is no cutting surface formed on a distal side 113 of the return aperture 108a, but the device can be reconfigured easily to add it if desired. Furthermore, in this embodiment, the blade tip 114 does not extend beyond a perimeter of the base.

FIG. 3 further depicts a cover 120 rotatably fastened to the base 102. In the configuration shown, cover 120 is disengaged from the cover via locking point 122 and rotated in a clockwise fashion at an angle of about 45° about pivot point 121. In order to re-engage the cover 120 and affix it to the base 102, the cover would be rotated in a counterclockwise fashion about pivot point 121 such that the pin hole of the cover 123 becomes aligned with the locking point 122; after this a locking pin or bolt can be inserted to lock the mechanism in place.

A second aspect of the invention is a deep-sea fishing line cutting system comprising:
  (a) the apparatus as described in any of the embodiments of the first aspect of the invention;
  (b) an extender mated to the apparatus which enables the apparatus to operate at a distance of at least 2 feet from an end of the extender; and
  (c) two straight-edge blades inserted into the seat,
  wherein an angle formed between the two blades is less than and 30°, and/or wherein no blade tip extends beyond a perimeter of the base and the cover.

Preferably, the system used in the second aspect of the invention comprises: (a) a fishing line cutting apparatus comprising a base; a cover rotatably fastened to the base; a single locking point to affix the base and the cover; and a seat disposed between the base and the cover on either side thereof; wherein when the cover and the base possess alignable return apertures.

Preferably, the system used in the second aspect of the invention also comprises (b) an extender affixable to the apparatus along a primary axis which enables the apparatus to operate at a distance of at least 2 feet from an end of the extender.

Yet further, preferably, the system used in the second aspect of the invention also comprises (c) two straight-edge blades inserted into the seat, thereby forming a cutting edge on a proximate side and a distal side of at least one of the alignable return apertures.

As described previously, the apparatus of the first aspect of the invention does not include the referenced extender and blade(s). The system of the second aspect presently does include such additional features. The apparatuses suitable for inclusion into the systems of the second aspect have already been described above and may encompass any of the embodiments described above in relation to the aforementioned first aspect of the invention.

The extender of the second aspect has also been described in relation to the first aspect, supra. In embodiments of the second aspect, however, the extender is selected to facilitate a deferred operation between the line cutting and the hand of the angler. As mentioned, this allows the angler to carefully separate the animal from the fishing line and/or hook at a safe distance, thereby minimizing the chance of being struck by the animal.

In an embodiment, the extender is mated to the apparatus, preferably via an end of the base thereof, such that the hand of the angler is positioned more than 2 feet from any portion of a cutting surface of the system. In a preferred embodiment, the distance is at least 3 feet, or at least 4 feet. In still other embodiments, the distance is between 1-20 feet, 2-20 feet, or between 1-10 feet, or between 2-10 feet, or between 1-8 feet, or between 2-8 feet, or between 1-6 feet, or between 2-6 feet, or between 1-4 feet, or between 2-4 feet, or between 3-20 feet, or between 3-10 feet, or between 3-8 feet, or between 3-6 feet, or between 3-4 feet.

Certain blades usable in the second aspect have also been described in relation to the first aspect, supra. In embodiments of the second aspect, however, the blades are straight-edge blades, and two are included into the system. It is desirable that the two straight-edge blades are located along the seat of the base of the accompanying apparatus such that one cutting edge is formed on a distal side of the return aperture and/or cover return aperture of the apparatus, and another cutting edge is formed on a proximate side of the return aperture and/or cover return aperture of the apparatus. In an embodiment, the two straight edge blades form an angle in relation there between of between 0.1° and 45°. In a preferred embodiment, however, the angle between the straight-edge blades is between 1-45°, or between 1-30°, or between 1-20°, or between 1-15°, or between 1-10°, or between 1-5°, or between 3-45°, or between 3-30°, or between 3-20°, or between 3-10°, or between 3-5°. Generally, from a safety perspective, it is preferred to minimize the angle formed between the two straight-edge blades, so as to minimize the size of the return aperture and/or cover return aperture and possibility of insertion of an errant finger. On the other hand, the angle must be configured not to be so small that it becomes difficult to locate and/or cut the desired fishing line.

A third aspect of the invention is a manual method of separating a marine fish from a fishing line, the method comprising:
  (a) providing a deep-sea line cutting apparatus as described in any of the embodiments of the first aspect of the invention and/or any of the systems of the second aspect, wherein if any of the apparatuses of the first aspect of the instant invention are employed;
  (b) positioning the apparatus such that the fishing line is placed within the return aperture; and
  optionally, (c) contacting the fishing line with at least one cutting edge to cut the fishing line;

Preferably the manual methods of the third aspect employ a deep-sea line cutting apparatus comprising a base affixable to an extender along a primary axis; a cover rotatably fastened to the base; a single locking point to affix the base and the cover; and a seat for receiving two blades disposed between the base and the cover on either side thereof; wherein when the cover and the base possess alignable return apertures; wherein the blades, when inserted to the seat, are capable of forming a cutting edge on a proximate side and a distal side of at least one of the alignable return apertures; wherein an angle formed between the blades is less than 30°; and wherein no blade tip extends beyond a perimeter of the base and the cover.

Manual methods of the third aspect also preferably fulfill the feature that the fishing line is cut at a point of greater than 3 feet from an end of the extender not affixed to the base.

In embodiments of the third aspect, in order to carry out the prescribed method for separating a marine fish from a fishing line, first, an apparatus as described according to any of the embodiments of the first aspect, and/or a system as described according to any of the embodiments of the second aspect is provided. Such apparatuses and systems have been described elsewhere herein, supra. It is understood that if an apparatus is used, that one or more blades are inserted therein, which occurs as described above by inserting conformal blades into the seat of the base and fastening the cover thereto in a method and manner described. Of course, an extender is also mated to the apparatus at an end of the base, whether directly or via some additional component, part, or sub-assembly. The extender is preferably a deck pole and will possess a distal end (in relation to the apparatus), preferably also with a hand grip, for maximum comfort and stability during operation.

According to embodiments of the third aspect, the apparatus or system is positioned away from the angler, preferably at a distance of several feet as described above in relation to embodiments of the second aspect, and at or near the animal in a desired location proximate thereto. If the hook is to be removed, the angler will position an intermediate tool such as the pike in a desired location at or near the animal's mouth in an attempt to remove the hook therefrom. If this practice is unsuccessful, infeasible, or otherwise impractical, in a preferred embodiment of the third aspect, the apparatus is positioned such that the desired section of fishing line is inserted into the return aperture. Thereafter, the angler will position the apparatus such that the desired location of the fishing line is contacted with a cutting edge. Thereafter, the line will be cut at the desired location and the animal will be released successfully.

According to additional embodiments of the third aspect, the angler affixes a billfish tag to the animal using the billfish tagging device affixed as an intermediate tool to the device, preferably before removing or attempting to remove the hook from the fish's mouth or the line from the device.

In embodiments of the third aspect, the fishing line is cut at a point of greater than 1 foot, or greater than 2 feet from the hand grip of the extender. In a preferred embodiment, the distance between the location at which the line is cut and the hand grip is at least 3 feet, or at least 4 feet. In still other embodiments, the distance is between 1-20 feet, or between 2-20 feet, or between 1-10 feet, or between 2-10 feet, or between 1-8 feet, or between 2-8 feet, or between 1-6 feet, or between 2-6 feet, or between 1-4 feet, or between 2-4 feet, or between 3-20 feet, or between 3-10 feet, or between 3-8 feet, or between 3-6 feet, or between 3-4 feet.

Additional Exemplary Embodiments

A first additional exemplary embodiment of the first aspect of the invention is a fishing line cutting apparatus (1, 101) comprising:

- a base (2, 102) affixable to an extender (4, 104), said base possessing a return aperture (8a, 108a);
- a cover (20, 120) rotatably fastened to the base, said cover further possessing a cover return aperture (8b, 108b); and a
- a locking point (22, 122) to affix the base and the cover, preferably a single locking point to affix the base and the cover; and
- a seat (10, 110) disposed between the base and the cover on either side thereof for receiving one or more blades (11, 111) to form a cutting edge on a proximate side (12, 112) and/or a distal side (13, 113) of the return aperture and/or the cover return aperture.

An additional exemplary embodiment of the first aspect is the previous additional exemplary embodiment of the first aspect, further wherein the apparatus is configurable such that, if one or more straight-edge blades is inserted into the seat, preferably conformally inserted into the seat, no blade tip (14) extends beyond a perimeter of the base and the cover.

An additional exemplary embodiment of the first aspect is either of the previous exemplary embodiments of the first aspect, wherein when one or more straight-edge blades is inserted into the seat conformally, no blade tip extends beyond a perimeter of the base and the cover, and/or each cutting edge is disposed entirely within the return aperture and/or cover return aperture.

An additional exemplary embodiment of the first aspect is any of the previous additional exemplary embodiments, further wherein the seat is configured to receive one or more blades to form a cutting edge on both a proximate side and a distal side of the return aperture.

An additional exemplary embodiment of the first aspect is the fishing line cutting apparatus of any of the previous additional exemplary embodiments, further wherein base is alignable to the extender along a primary axis (5, 105).

An additional exemplary embodiment of the first aspect is the fishing line cutting apparatus of any of the previous additional exemplary embodiments, wherein the cutting edge on the distal side (13, 113) is oriented at an angle of less than 45°, or less than 30°, or less than 20°, or less than 10°, or less than 5°, relative to the primary axis (5, 105).

An additional exemplary embodiment of the first aspect is the fishing line cutting apparatus of any of the previous additional exemplary embodiments, wherein the cutting edge on the distal side (13, 113) is substantially parallel to the primary axis (5, 105).

An additional exemplary embodiment of the first aspect is the fishing line cutting apparatus of any of the previous additional exemplary embodiments, wherein the cutting edge on the distal side (13, 113) is oriented at an angle of between 10 and 20 degrees relative to the cutting edge on the proximate side (12, 112).

An additional exemplary embodiment of the first aspect is the fishing line cutting apparatus of any of the previous additional exemplary embodiments, wherein the maximum width of the return aperture (8a, 108a) and/or the cover return aperture (8b, 108b) is 10 mm, or 9 mm, or 8 mm.

An additional exemplary embodiment of the first aspect is the fishing line cutting apparatus of any of the previous additional exemplary embodiments, wherein the base is affixable to the extender via threading and/or a locking collar concentrically positioned around an end (3) of the base and configured to slide axially along the extender.

An additional exemplary embodiment of the first aspect is the fishing line cutting apparatus of any of the previous additional exemplary embodiments, wherein the extender is a deck pole.

An additional exemplary embodiment of the first aspect is the fishing line cutting apparatus of any of the previous additional exemplary embodiments, wherein the base comprises a main segment (6, 106) and a return flange (7, 107) connected thereto, wherein the main segment and the return flange are configured to form the return aperture (8a, 108a) therebetween.

An additional exemplary embodiment of the first aspect is the fishing line cutting apparatus of any of the previous additional exemplary embodiments, wherein the cover comprises a cover main segment and a cover return flange connected thereto, wherein the cover main segment and the cover return flange are configured to form a cover return aperture (8b, 108b) therebetween.

An additional exemplary embodiment of the first aspect is the fishing line cutting apparatus of any of the previous additional exemplary embodiments, wherein the main segment and/or the cover main segment is elongated and is oriented at an angle of ±5° relative to the primary axis.

An additional exemplary embodiment of the first aspect is the fishing line cutting apparatus of any of the previous additional exemplary embodiments, wherein the return flange and/or the cover return flange is oriented along a secondary axis (9), wherein the secondary axis is oriented in a substantially anti-parallel direction relative to the main segment and/or the cover main segment, and/or the secondary axis is oriented at an angle of between 0-30° relative to the primary axis.

An additional exemplary embodiment of the first aspect is the fishing line cutting apparatus of any of the previous additional exemplary embodiments, wherein the return flange further comprises a rounded lip configured to cover the blade tip (14, 114) and at least a portion of the cutting edge on the distal side (13).

An additional exemplary embodiment of the first aspect is the fishing line cutting apparatus of any of the previous additional exemplary embodiments, wherein the seat is molded to fit two (2) utility blades (11, 111).

An additional exemplary embodiment of the first aspect is the fishing line cutting apparatus of any of the previous additional exemplary embodiments, wherein the utility blades are 2-notch utility blades.

An additional exemplary embodiment of the first aspect is the fishing line cutting apparatus of any of the previous additional exemplary embodiments, wherein the utility blades are straight-edge blades or serrated blades.

An additional exemplary embodiment of the first aspect is the fishing line cutting apparatus of any of the previous additional exemplary embodiments, wherein the cover (20, 120) is rotatably fastened to the base (2, 102) at a pivot point (21, 121) located on a side of the base (2, 102) such that the seat (10, 110) is located between the pivot point (21, 121) and the extender (4, 104).

An additional exemplary embodiment of the first aspect is the fishing line cutting apparatus of any of the previous additional exemplary embodiments, wherein the cover (20, 120) is shaped to cover substantially all of the entire perimeter of the base, but is configured so as not to cover the return aperture (8a, 108a).

An additional exemplary embodiment of the first aspect is the fishing line cutting apparatus of any of the previous additional exemplary embodiments, wherein the apparatus further comprises one or more intermediate tools, wherein the intermediate tools optionally comprise a bottle opener (31). a pike (32), or a billfish tagging device (130).

An additional exemplary embodiment of the first aspect is the fishing line cutting apparatus of any of the previous additional exemplary embodiments, wherein the apparatus is constructed of non-corrosive materials, wherein the non-corrosive materials comprise plastic, aluminum, or stainless steel.

A first additional exemplary embodiment of the second aspect of the invention is a deep-sea fishing line cutting system comprising: (a) any of the apparatuses as described in any of the additional exemplary embodiments of the first aspect of the invention; (b) an extender mated to the apparatus which enables the apparatus to operate at a distance of at least 2 feet from an end of the extender; and (c) two straight-edge blades inserted into the seat.

An additional exemplary embodiment of the second aspect is the deep-sea fishing line cutting system according to the previous additional exemplary embodiment, wherein an angle between the straight-edge blades is between 1-30°.

A first additional exemplary embodiment of the third aspect of the invention is a manual method of separating a marine fish from a fishing line, the method comprising: (a) providing an apparatus as described in any of the additional exemplary embodiments of the first aspect of the invention and/or any of the systems described in any of the additional exemplary embodiments of the second aspect of the invention said apparatus further comprising an extender with a hand grip and two blades; (b) positioning the apparatus such that the fishing line is placed within the return aperture; and (c) contacting the fishing line with at least one cutting edge to cut the fishing line.

An additional exemplary embodiment of the third aspect is the manual method of separating a marine fish from a fishing line of the third aspect of the previous additional exemplary embodiment, wherein the fishing line is cut at a point of greater than 3 feet from the hand grip, preferably between 3 to 8 feet from the hand grip.

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A fishing line cutting apparatus comprising:
   a base affixable to an extender, said base possessing a return aperture;
   a cover rotatably fastened to the base, said cover possessing a cover return aperture;

a single locking point to affix the base and the cover;
a seat disposed between the base and the cover on either side thereof for receiving one or more blades to form a cutting edge on a proximate side and/or a distal side of the return aperture and/or the cover return aperture;
wherein the apparatus is configurable such that, if one or more straight-edge blades is inserted into the seat, no blade tip extends beyond a perimeter of the base and the cover.

2. The line cutting apparatus of claim 1, wherein when one or more straight-edge blades is inserted into the seat conformally,
no blade tip extends beyond a perimeter of the base and the cover, and
each cutting edge is disposed entirely within the return aperture and/or cover return aperture,
and wherein the extender and the base are alignable along a primary axis, wherein the cutting edge on the distal side is oriented at an angle of less than 30°, relative to the primary axis.

3. The line cutting apparatus of claim 1, wherein the cutting edge on the distal side is substantially parallel to the primary axis.

4. The line cutting apparatus of claim 2, wherein the cutting edge on the distal side is oriented at an angle of between 10 and 20 degrees relative to the cutting edge on the proximate side.

5. The line cutting apparatus of claim 2, wherein a maximum width of the return aperture and/or the cover return aperture is 8 mm.

6. The line cutting apparatus of claim 2, wherein the base is affixable to the extender via threading and/or a locking collar concentrically positioned around an end of the base, and is configured to slide axially along the extender.

7. The line cutting apparatus of claim 6, wherein the extender is a deck pole.

8. The line cutting apparatus of claim 2, wherein the base and/or the cover comprises a main segment and a return flange connected thereto, wherein the main segment and the return flange are configured to form the return aperture and/or the cover return aperture therebetween.

9. The line cutting apparatus of claim 8, wherein the main segment is elongated and is oriented at an angle of ±5° relative to the primary axis.

10. The line cutting apparatus of claim 8, wherein the return flange is oriented along a secondary axis, wherein the secondary axis is oriented in a substantially anti-parallel direction relative to the main segment, and/or
the secondary axis is oriented at an angle of between 0-30° relative to the primary axis.

11. The line cutting apparatus of claim 10, wherein the return flange further comprises a rounded lip configured to cover the blade tip and at least a portion of the cutting edge on the distal side.

12. The line cutting apparatus of claim 2, wherein the seat is molded to fit two (2) utility blades.

13. The line cutting apparatus of claim 12, wherein the utility blades are 2-notch utility blades.

14. The line cutting apparatus of claim 12, wherein the utility blades are straight-edge blades or serrated blades.

15. The line cutting apparatus of claim 12, wherein the seat is located along the cover on a side facing the base, or along the base on a side facing the cover.

16. The line cutting apparatus of claim 2, wherein the cover is rotatably fastened to the base at a pivot point located on a side of the base such that the seat is located between the pivot point and the extender.

17. The line cutting apparatus of claim 16, such that the cover is shaped to cover substantially all of the entire perimeter of the base, and the cover return aperture is shaped to conform with or substantially with the return aperture.

18. The line cutting apparatus of claim 17, wherein the cover further comprises a locking flange, optionally also wherein the locking flange is oriented in a direction orthogonal to the base and/or to the cover.

19. The line cutting apparatus of claim 2, wherein the apparatus further comprises one or more intermediate tools, wherein the intermediate tools optionally comprise a bottle opener, a pike, and/or a billfish tagging device.

20. The line cutting apparatus of claim 19, wherein the apparatus is constructed of non-corrosive materials, wherein the non-corrosive materials comprise plastic, aluminum, or stainless steel.

21. A deep-sea fishing line cutting system comprising:
(a) a fishing line cutting apparatus comprising
a base;
a cover rotatably fastened to the base;
a single locking point to affix the base and the cover; and
a seat disposed between the base and the cover on either side thereof;
wherein when the cover and the base possess alignable return apertures;
(b) an extender affixable to the apparatus along a primary axis which enables the apparatus to operate at a distance of at least 2 feet from an end of the extender; and
(c) two straight-edge blades inserted into the seat conformally therein, thereby forming a cutting edge on a proximate side and a distal side of at least one of the alignable return apertures;
wherein an angle formed between the straight-edge blades is less than 30°; and
wherein no blade tip extends beyond a perimeter of the base and the cover.

22. The deep-sea fishing line cutting system of claim 21, wherein the seat is disposed on a side of the cover facing the base, and when the cover is rotated to align with the base and is locked thereto at the single locking point, the cutting edge on the distal side is oriented at an angle of less than 30°, relative to the primary axis.

23. The deep-sea fishing line cutting system of claim 22, wherein a maximum width of the alignable return apertures is 9 mm and/or an angle formed between the straight-edge blades is between 1 and 20°; and wherein the system further comprises one or more intermediate tools, wherein the intermediate tools optionally comprise a bottle opener, a pike, and/or a billfish tagging device.

24. The deep-sea fishing line cutting system of claim 22, wherein the apparatus further comprises a lip configured to cover the blade tip and at least a portion of the cutting edge on the distal side.

25. The deep-sea fishing line cutting system of claim 24, wherein the cover is shaped to cover substantially all of the entire perimeter of the base, and the alignable return apertures are shaped to conform with or substantially with each other.

26. A manual method of separating a marine fish from a fishing line, the method comprising:
(a) providing a deep-sea fishing line cutting apparatus comprising
a base affixable to an extender along a primary axis;
a cover rotatably fastened to the base;
a locking point to affix the base and the cover; and a seat for receiving two blades disposed between the base and the cover on either side thereof;

wherein when the cover and the base possess alignable return apertures;

wherein the blades, when inserted to the seat conformally, form a cutting edge on a proximate side and a distal side of at least one of the alignable return apertures;

wherein an angle formed between the blades is less than 30°; and wherein no blade tip extends beyond a perimeter of the base and the cover; and (b) positioning the apparatus such that the fishing line is placed within the aligned return apertures;

wherein the fishing line is cut at a point of greater than 3 feet from an end of the extender not affixed to the base.

27. The manual method of separating an animal from a fishing line of claim 26, further comprising the step of:

(c) contacting the fishing line with at least one cutting edge to cut the fishing line which has been placed within the aligned return apertures;

wherein the fishing line is cut at a point of between 3 to 8 feet from the end of the extender not affixed to the base.

28. The manual method of separating an animal from a fishing line of claim 26, wherein the blades comprise two straight-edge blades, wherein a maximum width of the alignable return apertures is 8 mm, wherein the apparatus further comprises a lip configured to cover the blade tip and at least a portion of the cutting edge on the distal side, and wherein the angle formed between the blades is between 1 and 20°.

29. The manual method of separating an animal from a fishing line of claim 28, wherein the fishing line cutting apparatus further comprises one or more intermediate tools further comprising a billfish tagging device, wherein the method further comprises, preferably before step (b), the step of (a2) applying a tag onto the animal using the billfish tagging device, wherein the steps of (a2) applying and (c) contacting are performed using the same single fishing line cutting apparatus by the same user.

30. The manual method of separating an animal from a fishing line of claim 29, wherein the animal is a marine fish, wherein the seat is disposed on a side of the cover facing the base, and when the cover is rotated to align with the base and locked thereto at the single locking point, the cutting edge on the distal side is oriented at an angle of less than 30°, relative to the primary axis.

* * * * *